United States Patent
Kaliyamoorthy et al.

(10) Patent No.: US 12,183,311 B2
(45) Date of Patent: Dec. 31, 2024

(54) CLOCK RECOVERY CIRCUIT

(71) Applicant: Xilinx, Inc., San Jose, CA (US)

(72) Inventors: Killivalavan Kaliyamoorthy, Vridhachalam (IN); Nedunuri Venkata Pattabhi Sai Ram, Hyderabad (IN); Phani Krishna Kondepudi, Hyderabad (IN); Kapil Usgaonkar, Hyderabad (IN); Pankaj Vasant Kumbhare, Hyderabad (IN)

(73) Assignee: XILINX, INC., San Jose, CA (US)

( * ) Notice: Subject to any disclaimer, the term of this patent is extended or adjusted under 35 U.S.C. 154(b) by 162 days.

(21) Appl. No.: 17/979,499

(22) Filed: Nov. 2, 2022

(65) Prior Publication Data

US 2024/0144897 A1    May 2, 2024

(51) Int. Cl.
*G09G 5/399* (2006.01)
*G09G 5/18* (2006.01)
*H04N 5/445* (2011.01)

(52) U.S. Cl.
CPC .............. *G09G 5/399* (2013.01); *G09G 5/18* (2013.01); *H04N 5/44504* (2013.01)

(58) Field of Classification Search
CPC ............................. G09G 5/18; H04N 5/44504
See application file for complete search history.

(56) References Cited

U.S. PATENT DOCUMENTS

| 2011/0267116 | A1 | 11/2011 | Yang et al. | |
|---|---|---|---|---|
| 2012/0093199 | A1* | 4/2012 | Liu | H04B 15/04 375/141 |
| 2012/0155585 | A1* | 6/2012 | Trotta | H04J 3/0685 375/354 |

OTHER PUBLICATIONS

Intel, "DisplayPort_Intel_FPGA_IP_User_Guide", Intel Quartus Prime Design Suite: 22.1, IP Version: 20.0.1, downloaded Aug. 30, 2022.
VESA, "VESA DisplayPort_DP_Standard", www.vesa.org, Apr. 19, 2018, Version 1.4a, Copyright 2006-2008 Video Electronics Standards Association.

* cited by examiner

*Primary Examiner* — Grace Q Li
(74) *Attorney, Agent, or Firm* — Crawford Maunu PLLC (57) ABSTRACT

A clock buffer has a clock-in port that inputs a reference clock and an enable port that inputs a video-clock-enable signal from a video receiver. The clock buffer generates a video pixel clock signal that has pulses of the reference signal as enabled by the video-clock-enable signal. The video receiver includes a link symbol extractor, a link-to-pixel mapper, and a timing generator that work to mirror the actual pixel data rate from the active period in a blanking period and thereby recover the actual video pixel clock.

18 Claims, 7 Drawing Sheets

CLOCK RECOVERY CIRCUIT

TECHNICAL FIELD

The disclosure generally relates to recovery of a video pixel clock signal in serial video transmissions.

BACKGROUND

One of the challenges in designing video data receivers is the recovery of the pixel clock. The pixel clock indicates the timing for receiving pixels on a serial link. The pixel clock is needed by the downstream data path that consumes the video data extracted by the receiver.

Digital video data is organized as a series of frames in which each frame is an image having a horizontal and a vertical pixel resolution, for example, 1280×720 pixels. To account for horizontal and vertical raster repositioning, a video frame can have a horizontal blanking region and a vertical blanking region in which there is no pixel data. The blanking regions can be filled with dummy data or used to send other data, such as audio data of or metadata.

The pixel clock rate can be determined from the dimensions of a video frame, including both active and blanking regions, and the frame rate. The active regions of a frame are parts having pixel data. For example, the pixel clock for a frame having a resolution of 1280×720 pixels and a frame rate of 60 frames/second can be determined as follows. "HACTIVE" is the horizontal resolution (e.g., 1280 active pixels), and "HBLANK" is the width, measured in pixels, of the horizontal blanking region (e.g., 370 dummy pixels) having dummy data. Similarly, "VACTIVE" is the vertical resolution (e.g., 720 active pixels), and "VBLANK" is the height, measured in pixels, of the vertical blanking region (e.g., 30 dummy pixels) having dummy data. The pixel clock rate can be calculated as: HTOTAL×VTOTAL×FRAME RATE, where:

$$HTOTAL=HACTIVE+HBLANK=1650 \text{ pixels}$$

$$VTOTAL=VACTIVE+VBLANK=750 \text{ pixels}$$

$$\text{FRAME RATE}=60 \text{ frames/second}$$

The pixel clock rate=1650×750×60=74.25 MHz. Any system that consumes the video data, such as a monitor, must have the pixel clock rate in order to maintain the appropriate frame rate.

A video data transmitter receives pixel data and generates link symbols for transmission. Each pixel can be represented by a group of link symbols. The transmitter can insert "fill" symbols in the active regions of the video data stream, because the pixel clock rate will be less than the link clock rate, which is the rate at which link symbols are transmitted.

On-chip variations in the transmitter and/or receiver can cause the pixel rate to fluctuate and thereby cause variations in the pixel clock. According to one approach to recover the pixel clock, the transmitter can include values in the symbol video stream that the receiver can use to correlate the pixel clock with the link symbol rate. For example, the DISPLAYPORT™ standard specifies transmitting "Mvid" and "Nvid" values with the video data. The Mvid and Nvid values indicate the relationship between the pixel clock and the serial link clock and enable the receiver to calculate the actual pixel clock frequency.

This approach can introduce significant latency, because multiple software iterations may be required to recalculate the pixel clock rate. Prior approaches to calculate the pixel clock rate use the Mvid and Nvid values and a phase-lock loop (PLL). Software intervention can calculate the pixel clock rate and program the PLL.

According to the DISPLAYPORT protocol, the Mvid value is 24 bits and the lower byte of Mvid is sent on every horizontal blanking region in order to convey dynamic granular changes in Mvid values. Thus, software intervention is needed on every horizontal line, such as through an interrupt service routine, to read the updated Mvid value. In addition, on every resolution change, the video pixel clock is regenerated from the new set of Mvid and Nvid values, causing the PLL to lose and regain the lock.

SUMMARY

A disclosed circuit arrangement includes a clock buffer circuit that has a clock-in port coupled to input a reference clock signal and an enable port coupled to input a video-clock-enable signal. The clock buffer circuit is configured to generate a video pixel clock signal having pulses of the reference clock signal as enabled by the video-clock-enable signal.

A disclosed video receiver includes a link symbol extractor, a link-to-pixel mapper, and a timing generator. The link symbol extractor is configured to receive video data and a link clock signal, assert a link-data-enable signal during an active period in response to valid link symbols in the video data, and assert during a blanking period, a link-data-enable-blanking signal for a period derived from a count of the valid link symbols during the active period. The link-to-pixel mapper is clocked by the link clock signal to convert the valid link symbols to active pixels in response to the link-data-enable signal, and convert dummy link symbols in the video data to dummy pixels in response to the link-data-enable-blanking signal. The link-to-pixel mapper is clocked by a reference clock signal to provide the active pixels and dummy pixels. The timing generator is configured to assert a video-enable-active signal in response to availability of active pixels and assert a video-enable-blanking signal in response to availability of dummy pixels. An OR logic circuit is configured to assert a video-clock-enable signal in response to either the video-enable-active signal or the video-enable-blanking signal being asserted. A clock buffer circuit has a clock-in port coupled to input the reference clock signal and an enable port coupled to input the video-clock-enable signal. The clock buffer circuit is configured to generate a video pixel clock signal having pulses of the reference clock signal as enabled by the video-clock-enable signal.

Other features will be recognized from consideration of the Detailed Description and Claims, which follow.

BRIEF DESCRIPTION OF THE DRAWINGS

Various aspects and features of the clock recovery circuit will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosure presents a technique for generating a video pixel clock signal and recovering the pixel clock from a serial stream of video data by a receiver. The video pixel clock can be generated in response to a single-bit signal that mirrors dynamic variations in the pixel data rate. The single-bit signal eliminates the need for software intervention which can drastically improve the performance of the overall system. In a protocol such as DISPLAYPORT, the disclosed circuitry does not depend on Mvid and Nvid values and thereby eliminates software intervention. The disclosed circuitry also eliminates the need for a PLL and other data rate monitoring modules, thereby avoiding the latency of locking the PLL and reducing resource requirements.

A single bit "video-clock-enable" signal can be generated by a receiver circuit, and the video-clock-enable signal toggles (changes between asserted and de-asserted states) according to the actual frequency of the video pixel clock with respect to a constant reference clock. The video-clock-enable signal is provided to the clock enable input of a clock buffer circuit, which takes a constant reference clock as the clock input. The resulting output from the clock buffer circuit is the recovered video pixel clock signal.

Consistent with the disclosed techniques, counts of "valid" link symbols can be used in generating the single-bit, video-clock-enable signal. A "valid video link symbol" (or "valid symbol" for brevity) is a link symbol having data for generating a pixel. For example, in the DISPLAYPORT protocol, the available link bandwidth is divided into "micro-packets" which are referred to as "TUs (Transfer units)" in SST (Single Stream Transport) mode and "MTPs" (Multi-stream Transport Packets) in MST (Multi-Stream Transport) mode, and the video data is packed into these TUs/MTPs. The rate of the video data that is to be transported on the link is less than or equal to the link symbol rate. When the rate of the video data that is to be transmitted on the link is less than the link symbol rate, the transmitter fills a part of each TU/MTP with fill symbols. Thus, each TU/MTP can include valid link symbols whose values contribute to pixels and fill symbols that can be ignored.

The counts of valid link symbols in the active periods are retained and then used in blanking periods to generate a separate enable signal that toggles in the blanking periods according to the pixel data rate of the active periods. An "active period" is the time period during which a line of a frame of video pixel data is extracted from the active link symbols in a serial video data stream. A "blanking period" is the time period during which dummy link symbols in a blanking region of a line of a frame are processed. Together, a first video enable in an active period and a second video enable signal in the subsequent blanking period are used to generate a single-bit enable signal that continuously follows the actual pixel rate with respect to a constant reference clock.

The disclosed clock recovery circuitry avoids the latency of conventional approaches used to recover the video pixel clock and allows a processor to perform tasks other than responding to resolution changes for clock recovery. The reduction in latency is even more significant in systems and applications in which there are multiple resolution changes. The disclosed approaches also reduce memory requirements by eliminating the need to implement frame buffers for responding to resolution changes. The pixel clock can be recovered almost instantaneously as the single-bit video enable signal gets generated in parallel with the video pixel output.

Figure 1:
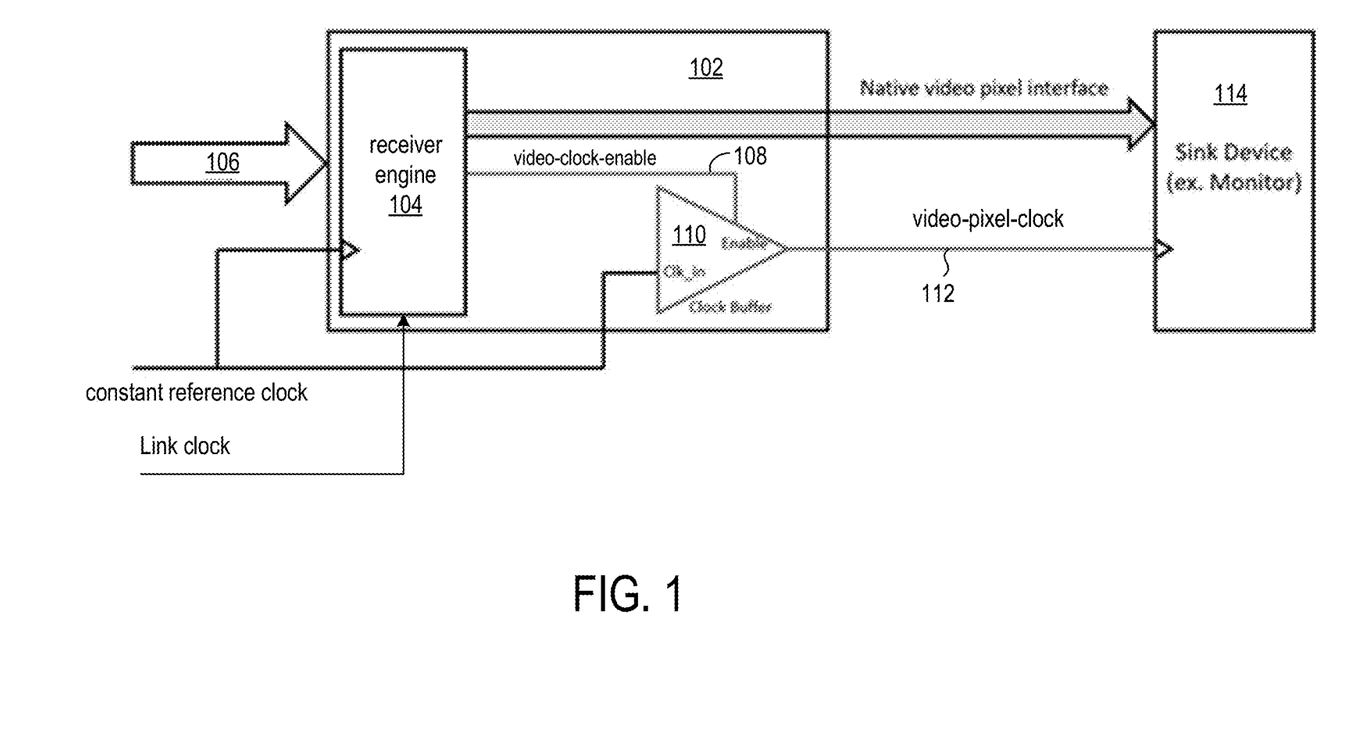
FIG. 1 shows a circuit for generating a video-pixel-clock signal according to the disclosed approaches.

FIG. 1 shows a circuit for generating a video-pixel-clock signal according to the disclosed approaches. The receiver 102 includes a receiver engine 104 that includes logic for extracting pixel data from an input video symbol stream 106 and generating a video-clock-enable signal 108 based on valid link symbol counts in the input data stream. In both the active and blanking periods, the valid link symbol counts from the active periods are used to generate the video-clock-enable signal.

The receiver engine receives the video symbol stream at the rate of the link clock signal. The link clock can be communicated from the transmitter (not shown) to the receiver at the time of link training.

The receiver 102 includes a clock buffer circuit 110 that is responsive to a constant reference clock signal and the video-clock-enable signal. The video-clock-enable signal is provided to the enable input of the clock buffer circuit. In response to the video-clock-enable signal being asserted, the clock buffer circuit outputs the video-pixel-clock signal 112, which is the pixel clock signal that can be passed on to downstream devices 114, such as monitors.

Figure 2:
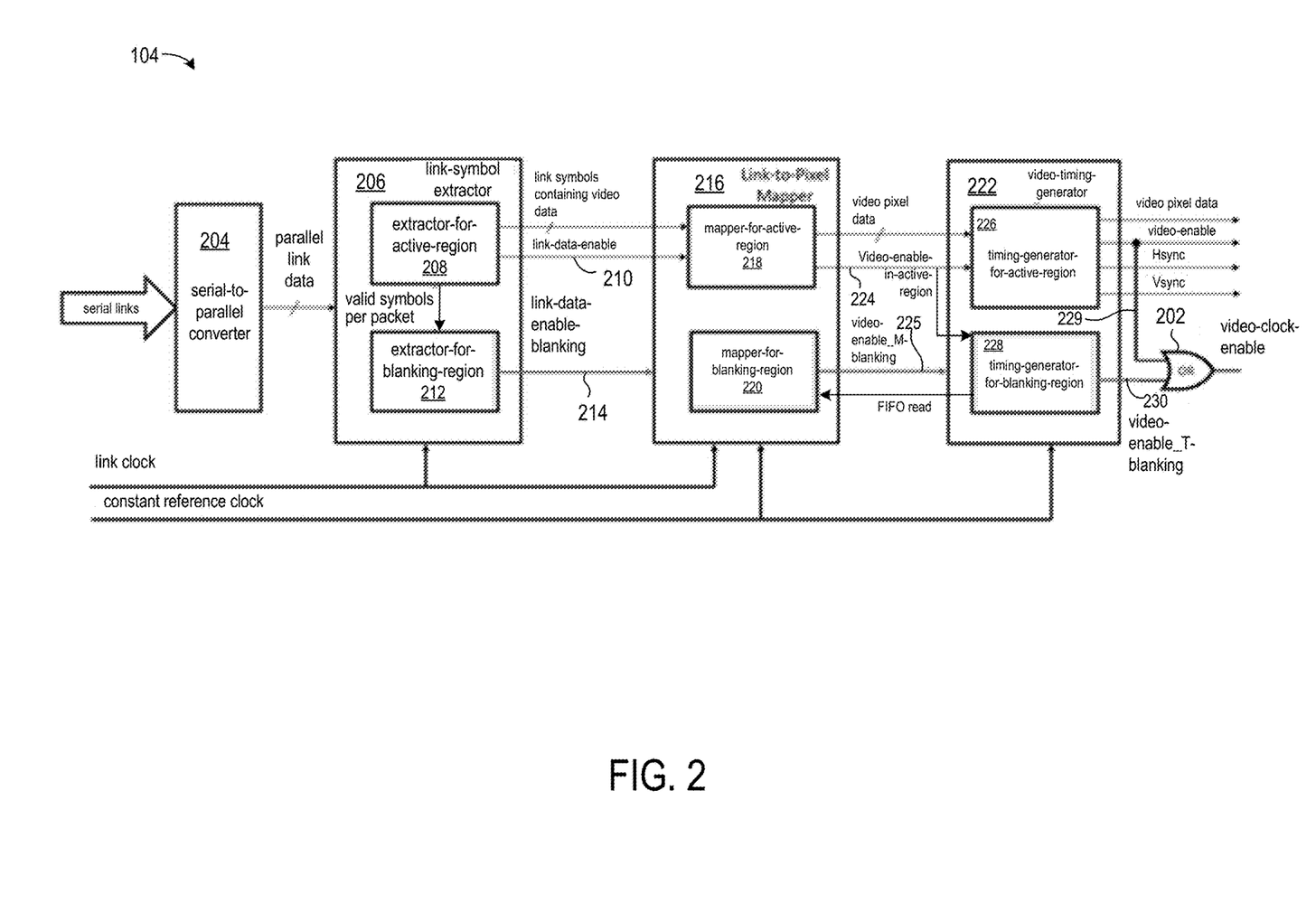
FIG. 2 shows an expanded view of the circuits comprising an exemplary receiver engine.

FIG. 2 shows an expanded view of the circuits comprising an exemplary receiver engine 104. The receiver engine generally has two parallel data paths. One path extracts pixel data from the link symbols and generates the video-enable signal in the active period, and the other path generates a video-enable_T-for-blanking signal that mimics (an imitation) the video-enable signal during the blanking period. The OR gate 202 asserts the video-clock-enable signal 204, which is provided to the enable input of the clock buffer 110 in FIG. 1, in response to either of the video-enable or video-enable_T-for-blanking signals being asserted (having logic TRUE values).

The serial to parallel converter 204 receives serial link symbols over multiple lanes (e.g., 4 lanes) and converts the data into parallel data (e.g., 8, 16 or 32-bit data). The link symbols are provided to the link-symbol-extractor circuit 206 (or "link symbol extractor" for brevity). The link symbol extractor circuit 206 inputs the parallel link symbol values along with the link clock signal and extracts valid video link symbols from the link symbols. The link symbols in an active region can include fill symbols and control symbols. For example, according to the DISPLAYPORT specification, valid video data is packed in the active period of the video resolution and is between Blanking End (BE) Blanking Start (BS) control symbols. Because the actual pixel data rate is always less than the link data rate, fill symbols are often inserted in TUs/MTPs in the active period and are delimited by Fill Start (FS) and Fill End (FE) control symbols.

The extractor-for-active-region circuit 208 extracts and outputs the valid link symbols and generates a link-data-enable signal 210 that is asserted (to logic TRUE) in response to valid link symbols, de-asserted (logic FALSE) in response to fill symbols, and de-asserted during the blanking period. The link-data-enable signal toggles according to the video data rate and has a constant logic FALSE value during blanking.

The extractor-for-active-region circuit 208 also counts the number of valid symbols per packet (e.g., TU or MTP) and communicates that value to the extractor-for-blanking-region circuit 212. The extractor-for-blanking-region circuit 212 uses the count of valid symbols and the link clock signal to determine when to toggle (assert and deassert) the link-data-enable-blanking signal 214, such that the periods of asserted and de-asserted states are derived from the count. In the blanking period, the link-data-enable-blanking signal 214 mimics the active period states of the link-data-enable signal 210.

The link-to-pixel mapper circuit 216 (or "link-to-pixel mapper" for brevity) has a mapper circuit 218 for processing the active region of video data and another mapper circuit 220 for processing the blanking region of video data.

The mapper-for-active-region circuit 218 converts valid link symbols in the active region to video pixel data and outputs the video pixel data to the video-timing-generator circuit 222 (or "timing generator" for brevity). The mapper-for-active-region circuit 218 also generates a video-enable-in-active-region signal 224 that indicates timing of each pixel in the output video pixel data.

The mapper-for-blanking-region circuit 220, during the blanking period, generates dummy video pixels at the rate that pixels in the video pixel data were generated during the active period by the mapper-for-active-region circuit 218. The mapper-for-blanking-region circuit 220 also generates a video-enable_M-blanking signal 225 that toggles during the blanking period at the rate the video-enable-in-active-region signal 224 toggled during the active period.

The video-timing-generator circuit 222 has a timing-generator-for-active-region circuit 226 and a timing-generator-for-blanking-region circuit 228. The timing-generator-for-active-region circuit 226 outputs the video pixel data and generates the video-enable-active 229 signal to indicate the rate of pixels output in the video pixel data. The Hsync and Vsync signals indicate the beginning of a horizontal scan line of a frame and the beginning of a frame.

The timing-generator-for-blanking-region circuit 228 generates a video-enable_T-blanking signal 230, which toggles during the blanking period at the rate at which the video-enable signal toggled during the active period.

The OR circuit 202 inputs the video-enable signal and the video-enable_T-blanking signal 230. The output video-clock-enable signal toggles during the active period according to the video-enable signal and toggles during the blanking period according to the video-enable_T-blanking signal 230.

Figure 3:
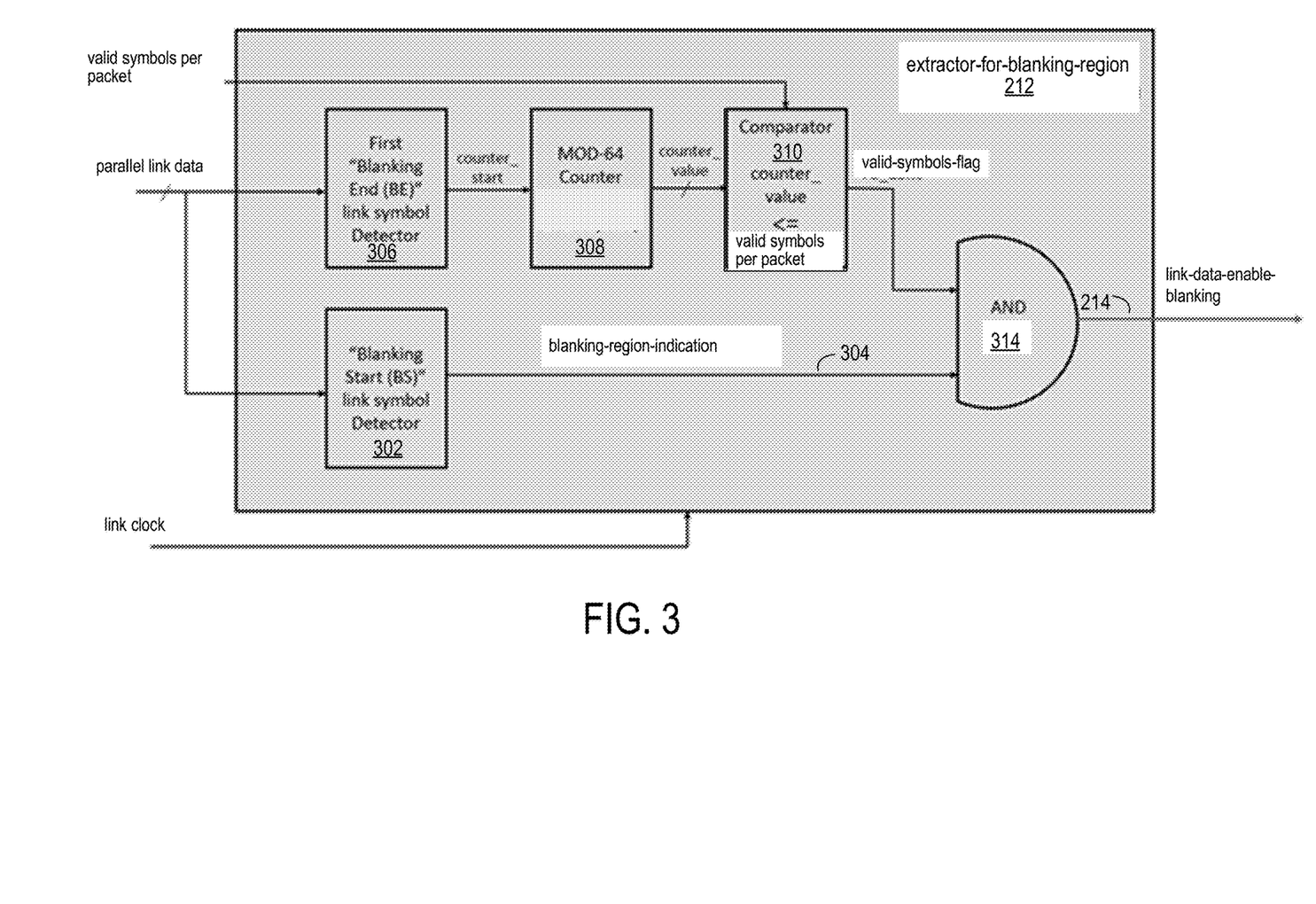
FIG. 3 shows an expanded view of the extractor-for-blanking-region circuit.

FIG. 3 shows an expanded view of the extractor-for-blanking-region circuit 212. The extractor-for-blanking-region circuit 212, as clocked by the link clock signal, generates the link-data-enable-blanking signal in response to the input parallel link data and the count of valid symbols per packet. The link-data-enable-blanking signal toggles during the blanking period at the same rate the link-data-enable signal 210 (FIG. 2) toggled during the active period The blanking start link symbol detector 302 is a circuit that asserts a blanking-region-indication signal 304 during a blanking period by detecting a blanking start (BS) link symbol in the parallel link data. The blanking start link symbol detector 302 de-asserts the blanking-region-indication signal in response to detecting a blanking end (BE) link symbol in the parallel link data.

The first BE link symbol detector 306 detects the first occurrence of a BE link symbol in the parallel link data and asserts the counter-start signal, which is input to the MOD-64 counter 308. The MOD-64 counter increments with each cycle of the link clock signal. The MOD-64 (modulus 64) counter is exemplary and corresponds to a TU size of 64 link symbols as processed in 64 cycles of the link clock signal. The modulus of the counter can vary according to application or protocol requirements, and can be programmable by a register (not shown) having the modulus value.

The current counter-value output by the MOD-64 counter is input to the comparator 310. The comparator compares the input counter-value to the input count of valid symbols per packet (e.g., TU or MTP), which is provided by the extractor-for-active-region circuit 208 (FIG. 2). While the counter-value is less than or equal to the count of valid symbols per packet, the valid-symbols-flag is asserted. The valid-symbols-flag is de-asserted once the MOD-64 reaches a counter-value that is greater than the number of valid symbols per packet. While the blanking-region-indication signal 304 and the valid-symbols-flag signal are asserted to a logic true value, the AND circuit 314 asserts the link-data-enable-blanking signal.

Figure 4:
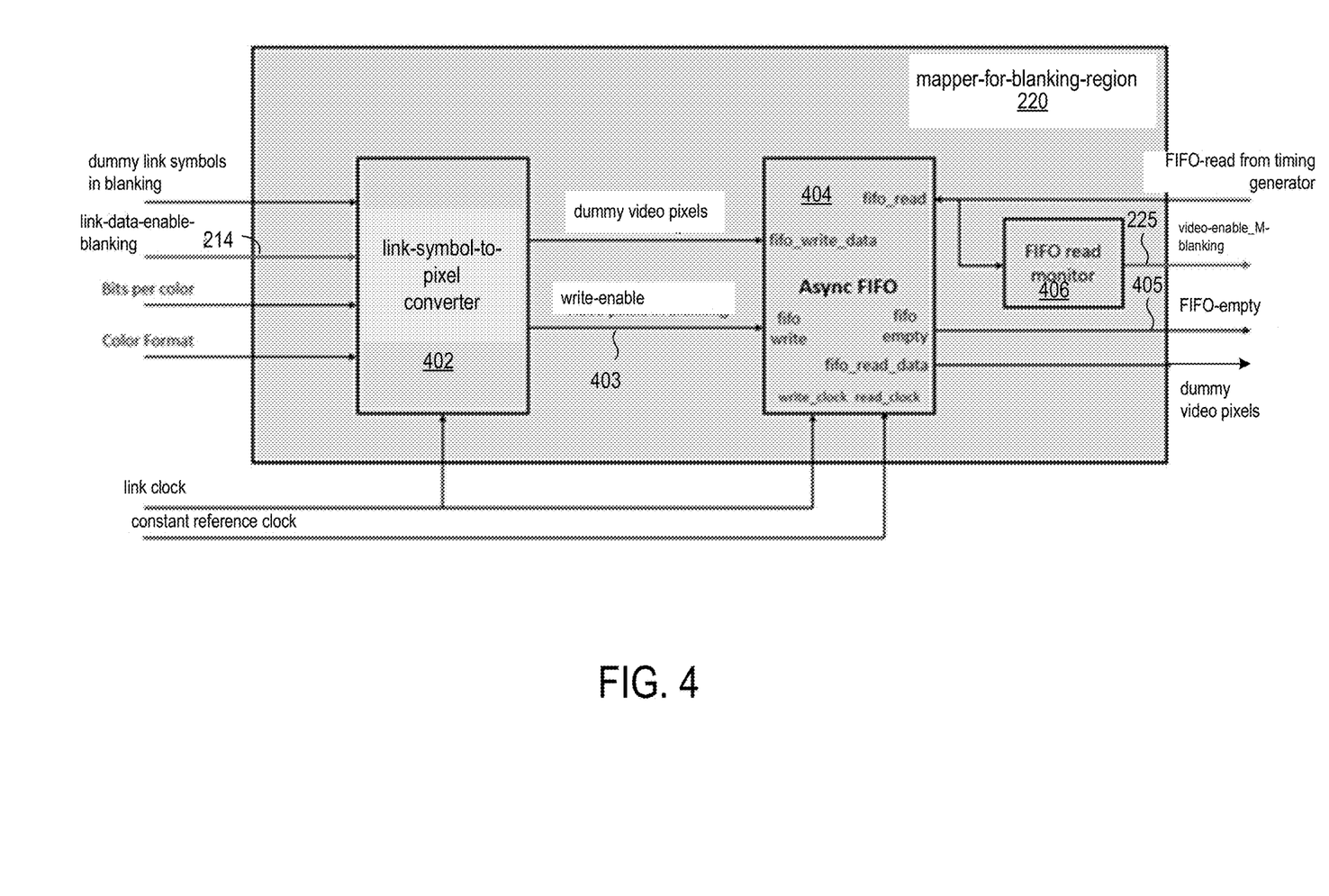
FIG. 4 shows an expanded view of the mapper-for-blanking-region circuit.

FIG. 4 shows an expanded view of the mapper-for-blanking-region circuit 220. The notable output the mapper-for-blanking region circuit is the video-enable_M-blanking signal 225 that toggles during the blanking period at the rate the video-enable-in-active-region signal 224 (FIG. 2) toggled during the active period.

The link-symbol-to-pixel-converter 402 inputs the dummy link symbols of a blanking region, the link-data-enable-blanking signal 214, a bits-per-color value, and a color-format value. The dummy link symbols can be any constant value, such as 0 or another value, inserted in the blanking region between BS and BE by the transmitter. The dummy link symbols are converted to dummy pixels by the link-symbol-to-pixel-converter according to the bits-per-color and color format values.

The link-data-enable-blanking signal 214 is provided by the extractor-for-blanking region circuit 212. The bits-per-color value, and a color-format value indicate the required format of the pixel data to be generated from the dummy link symbols. The bits-per-color value and color-format value can be provided by the transmitter such as in a Main Stream Attribute (MSA) packet in the DISPLAYPORT protocol. The link-data-enable-blanking signal indicates when the dummy link symbols in the blanking region are available to be converted. Only when the link-data-enable-blanking signal is asserted are the dummy link symbols considered by the converter 402 to convert into dummy video pixels. In a blanking region, the link-data-enable-blanking signal remains high for the number of link clock cycles equal to the count of valid symbols per packet (taken from the active period) and remains low for the remainder of link clock cycles for the packet size (e.g., a total of 64 link clock cycles for a 64 byte TU packet size). Thus, the link-data-enable-blanking signal will toggle to indicate dummy link symbols in blanking when high and fill symbols in blanking when low.

The link-symbol-to-pixel converter 402 converts input dummy link symbols from the blanking region into dummy video pixels and provides the dummy video pixels to the write-data input of the asynchronous first-in-first-out (FIFO) buffer circuit 404 (or "FIFO circuit" or "FIFO" for brevity). The link-symbol-to-pixel converter provides a write-enable signal 403 to the write-control input of the FIFO circuit to enable the writing of each dummy video pixel. Writing to the FIFO circuit is clocked by the link clock signal.

The FIFO circuit provides a FIFO-empty signal 405 to the timing-generator-for-blanking-region circuit 228 (FIGS. 2, 5) to indicate whether or not the FIFO circuit is empty. As long as the FIFO circuit is not empty, the FIFO circuit maintains the FIFO-empty signal in a de-asserted state to indicates that the FIFO circuit is not empty. In response to the FIFO-empty signal indicating that the FIFO circuit is not empty, the timing-generator-for-blanking-region circuit 228 (FIGS. 2, 5) asserts the FIFO-read signal to the read-control port of the FIFO circuit. The FIFO-read monitor 406 effectively loops back the FIFO-read signal to the timing-generator-for-blanking-region circuit 228 as the video-enable_M-blanking signal. The FIFO-read signal is asserted by the timing-generator-for-blanking-region circuit 228 as long as the FIFO circuit is not empty. Thus, the video-enable_M-blanking signal is asserted for a duration equal to the duration of assertion of the FIFO-read signal.

The video-enable_M-blanking signal will toggle because the FIFO circuit will be non-empty some of the time and be empty some of the time (FIFO-read signal is asserted when the FIFO circuit is not empty, and FIFO-read is de-asserted when the FIFO circuit is empty). The FIFO circuit will at times be empty, because the writing of dummy video pixels is in accordance with the rate of actual video pixel clock although the writes to FIFO are clocked by link clock signal, and the reading of the dummy pixels is at the frequency of the constant reference clock, which is faster than the video pixel clock. Thus, the video-enable_M-blanking signal, which toggles as a function of the FIFO-empty signal, reflects the number of writes into FIFO, which in turn follows the actual video pixel clock. Thereby, the toggles of the video-enable_M-blanking signal reflect the actual video pixel clock rate with respect to the constant reference clock during the blanking period.

Dummy pixels output from the FIFO circuit 404 can be ignored, because only the video-enable_M-blanking signal is needed from the mapper circuit 220 to recover the video pixel clock signal.

Figure 5:
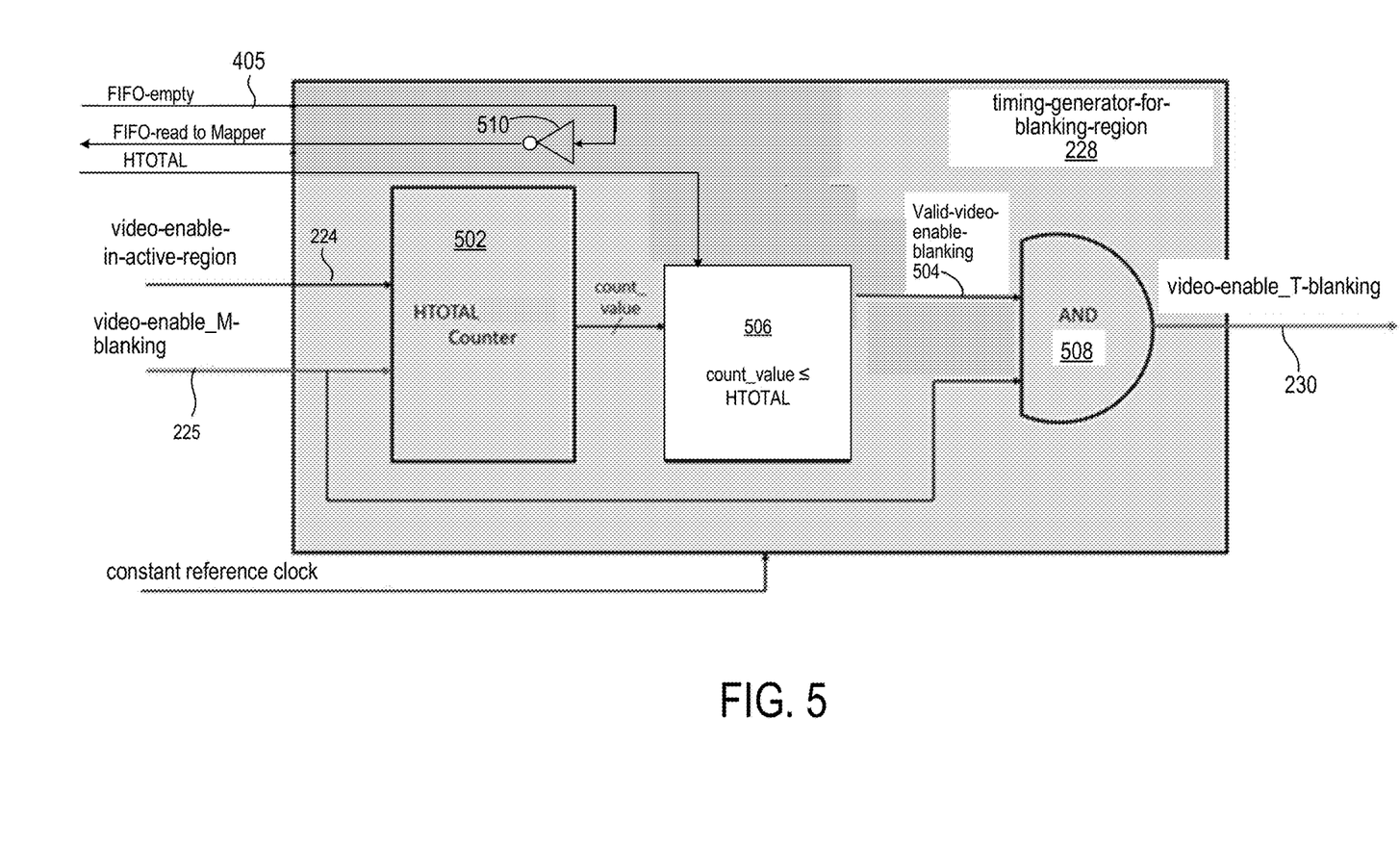
FIG. 5 shows an expanded view of the timing-generator-for-blanking region circuit.

FIG. 5 shows an expanded view of the timing-generator-for-blanking region circuit 228. The timing-generator-for-blanking region circuit generates the video-enable_T-blanking signal 230, which during the blanking period mimics how the video-enable signal 229 (FIG. 2) toggled during the active period. The timing-generator-for-blanking-region circuit 228 is timed by the reference clock signal and inputs the value of HTOTAL, the FIFO-empty signal 405, the video-enable-in-active-region signal 224, and the video-enable_M-blanking signal 225. HTOTAL, which can be communicated in the stream of video data in a packet separate from the link symbols. The extractor-for-blanking-region circuit 212 extracts HTOTAL from the parallel link data (e.g., from an MSA packet) and provides HTOTAL to the timing generator.

The FIFO circuit 404 (FIG. 4) is expected to become empty after HTOTAL number of pixels are read from the FIFO. Even if the FIFO circuit does not become empty (for reasons explained below), the FIFO-read signal is de-asserted in response to the count-value from counter 502 being greater than HTOTAL. NOT/inverter circuit 510 asserts the FIFO-read signal in response to the FIFO-empty signal being de-asserted. The video-enable-in-active-region signal 224 resets the counter 502, and the video-enable_M-blanking signal 225 causes the counter to increment.

In the DISPLAYPORT protocol, the count of valid symbols per packet can be a fractional value. Therefore, to maintain the correct number of symbols over time, in an exemplary implementation the DISPLAYPORT transmitter sends one more link symbol than the count of valid symbols per packet in some TUs. In a DISPLAYPORT receiver, the extractor circuit (e.g., FIG. 2, #208) receives the extra link symbol in the active region for some of the TUs. The extra link symbol can cause extra assertions of the link-data-enable-blanking signal 214 from the extractor-for-blanking-region circuit 212 (FIG. 3). Irrespective of the number of assertions of the link-data-enable-blanking signal 214 per horizontal line, the HTOTAL pixel count should remain constant after the link symbols are converted into pixels by the mapper circuit 216 (FIG. 2), because HTOTAL is the sum of the number of active pixels and number of dummy pixels in the blanking region.

The valid-video-enable-blanking signal 504 is used to suppress any extra assertions of the video-enable_M-blanking signal 225. After counting HTOTAL pixels, the comparator 506 de-asserts the valid-video-enable-blanking signal 504, and in response AND circuit 508 will de-assert the video-enable_T-blanking signal 203 so that any extra assertions of the video-enable_M-blanking signal 225 caused by the link-data-enable-blanking signal 214 (FIGS. 2, 3) are suppressed.

Figure 6:
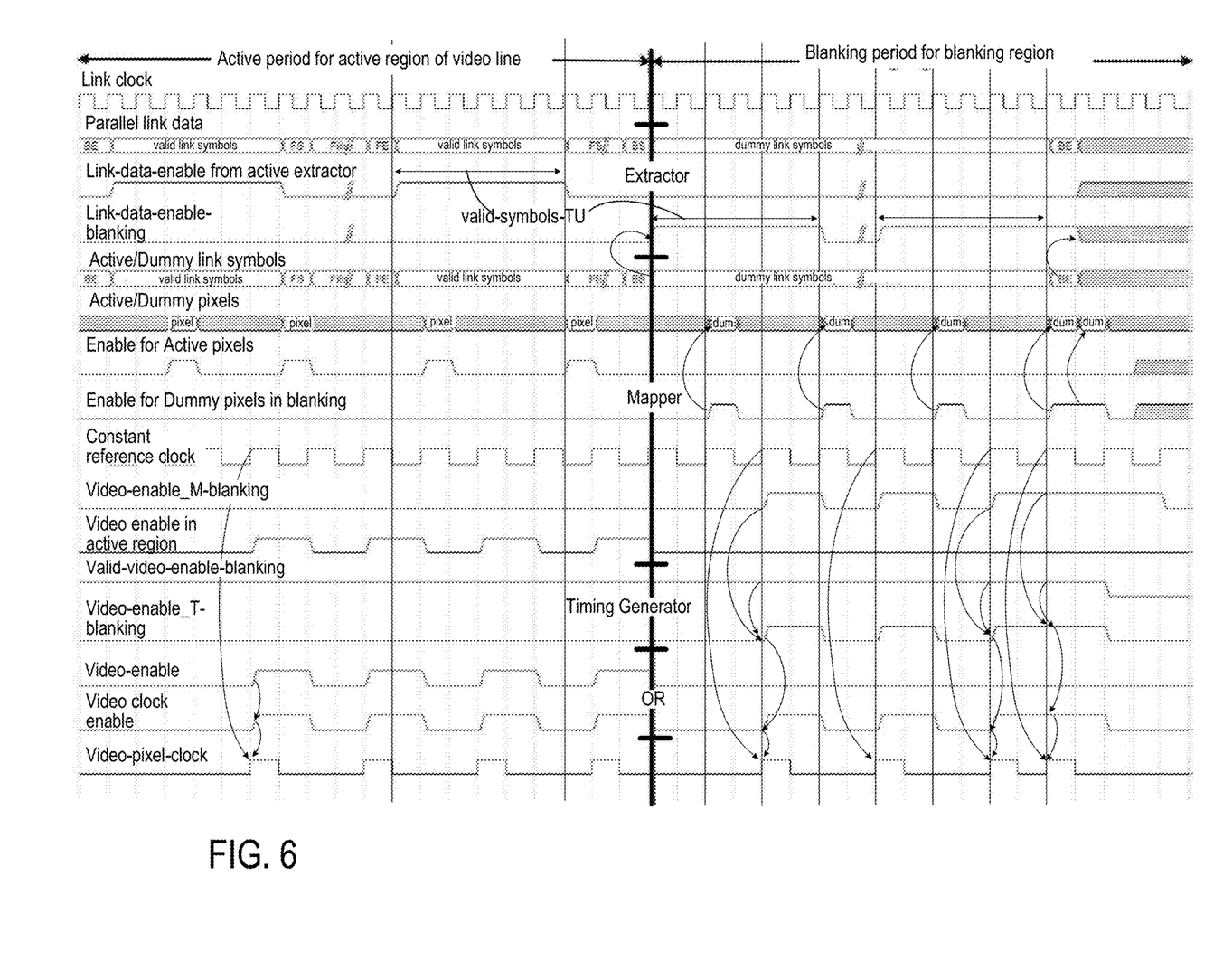
FIG. 6 shows a timing diagram of signals referenced in FIGS. 1-5.

FIG. 6 shows a timing diagram of signals referenced in FIGS. 1-5. The timing diagram is generally divided into an active period in which valid link symbols are processed and a blanking period in which dummy link symbols are processed. The signals are generally grouped by the circuit components (extractor 206, mapper 216, timing generator 222, and OR gate 202) that generate or are responsive to the signals. The frequency of the link clock signal is a multiple of the constant reference clock for ease of illustration. However, the exemplified relationship may not apply to actual implementations. Also for ease of illustration, the exact latencies between different inputs and outputs of each module are not depicted.

The labels used in the timing diagram are as follows:
BE=Blanking End link symbol
BS=Blanking Start link symbol
FS=Fill Start link symbol
FE=Fill End link symbol
Fills=Fill link symbol (typically 0s)
pixel=Valid pixel
dum=Dummy pixel The disclosed circuits generate the correct number of video-pixel-clock pulses for a specified video frame rate, which is a required feature of the video pixel clock. As explained previously, the number of video-pixel-clock pulses exactly matches the value of HTOTAL for each horizontal line in a frame, thereby maintaining the correct number of video-pixel-clock pulses for the specified video frame rate. In the example of FIG. 6, HTOTAL=8, and the video-pixel-clock signal has 8 pulses.

Figure 7:
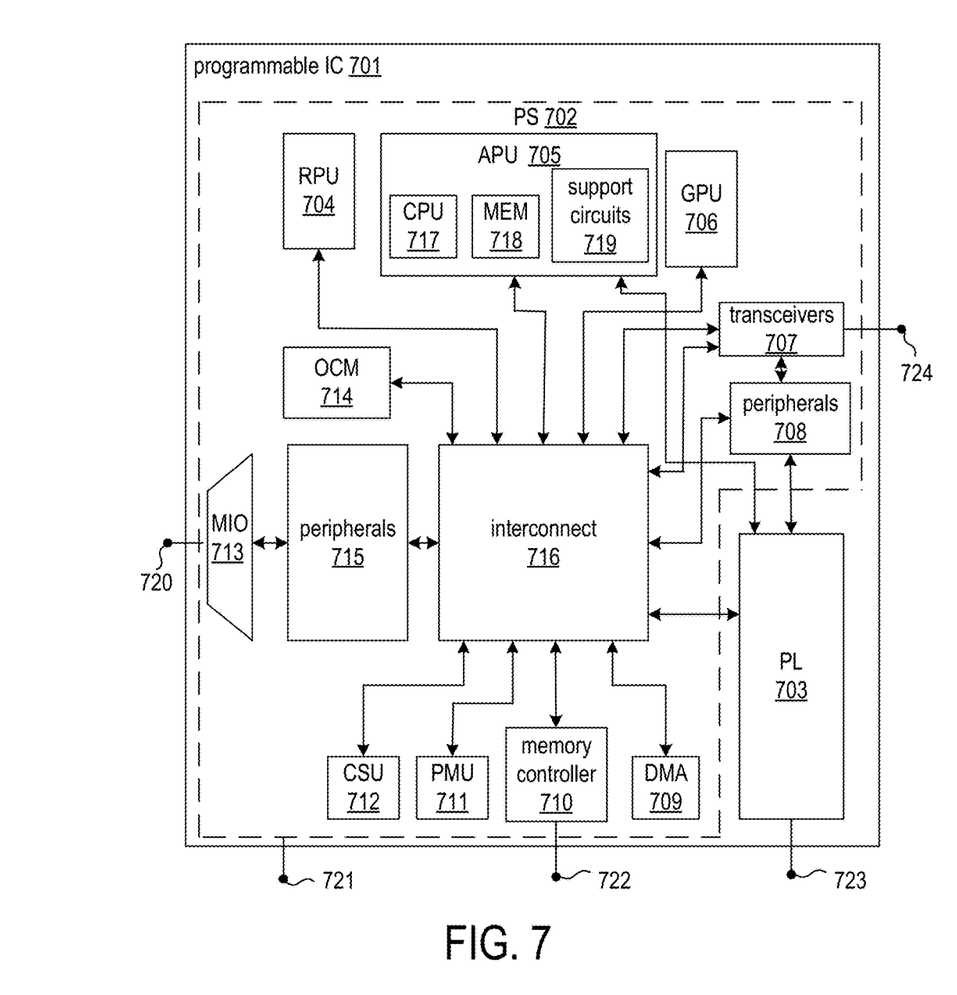
FIG. 7 is a block diagram depicting a System-on-Chip (SoC) that can host the disclosed clock recovery circuitry according to an example.

FIG. 7 is a block diagram depicting a System-on-Chip (SoC) 701 that can host the disclosed clock buffer and clock recovery circuitry according to an example. In the example, the SoC includes the processing subsystem (PS) 702 and the programmable logic subsystem 703. The processing subsystem 702 includes various processing units, such as a realtime processing unit (RPU) 704, an application processing unit (APU) 705, a graphics processing unit (GPU) 706, a configuration and security unit (CSU) 712, and a platform management unit (PMU) 711. The PS 702 also includes various support circuits, such as on-chip memory (OCM) 714, transceivers 707, peripherals 708, interconnect 716, DMA circuit 709, memory controller 710, peripherals 715, and multiplexed (MIO) circuit 713. The processing units and the support circuits are interconnected by the interconnect 716. The PL subsystem 703 is also coupled to the interconnect 716. The transceivers 707 are coupled to external pins 724. The PL 703 is coupled to external pins 723. The memory controller 710 is coupled to external pins 722. The MIO 713 is coupled to external pins 720. The PS 702 is generally coupled to external pins 721. The APU 705 can include a CPU 717, memory 718, and support circuits 719. The APU 705 can include other circuitry, including L1 and L2 caches and the like. The RPU 704 can include additional circuitry, such as L1 caches and the like. The interconnect 716 can include cache-coherent interconnect or the like.

Referring to the PS 702, each of the processing units includes one or more central processing units (CPUs) and associated circuits, such as memories, interrupt controllers, direct memory access (DMA) controllers, memory management units (MMUs), floating point units (FPUs), and the like. The interconnect 716 includes various switches, busses, communication links, and the like configured to interconnect the processing units, as well as interconnect the other components in the PS 702 to the processing units.

The OCM 714 includes one or more RAM modules, which can be distributed throughout the PS 702. For example, the OCM 714 can include battery backed RAM (BBRAM), tightly coupled memory (TCM), and the like. The memory controller 710 can include a DRAM interface for accessing external DRAM. The peripherals 708, 715 can include one or more components that provide an interface to the PS 702. For example, the peripherals can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose (GPIO) ports, serial advanced technology attachment (SATA) ports, PCIe ports, and the like. The peripherals 715 can be coupled to the MIO 713. The peripherals 708 can be coupled to the transceivers 707. The transceivers 707 can include serializer/deserializer (SERDES) circuits, MGTs, and the like.

Various logic may be implemented as circuitry to carry out one or more of the operations and activities described herein and/or shown in the figures. In these contexts, a circuit or circuitry may be referred to as "logic," "module," "engine," or "block." It should be understood that logic, modules, engines and blocks are all circuits that carry out one or more of the operations/activities. In certain implementations, a programmable circuit is one or more computer circuits programmed to execute a set (or sets) of instructions stored in a ROM or RAM and/or operate according to configuration data stored in a configuration memory.

Though aspects and features may in some cases be described in individual figures, it will be appreciated that features from one figure can be combined with features of another figure even though the combination is not explicitly shown or explicitly described as a combination.

The circuits are thought to be applicable to a variety of systems for recovering a clock signal in in a stream of video data. Other aspects and features will be apparent to those skilled in the art from consideration of the specification. The circuits may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A circuit arrangement, comprising:
   a clock buffer circuit having a clock-in port coupled to input a reference clock signal and an enable port coupled to input a video-clock-enable signal and configured to generate a video pixel clock signal having pulses of the reference clock signal as enabled by the video-clock-enable signal; and
   a receiver circuit configured to assert the video-clock-enable signal while outputting active pixels during an active period responsive to the reference clock signal, and during a blanking period imitate assertions of the video-clock-enable signal made during the active period.

2. The circuit arrangement of claim 1, wherein:
   the receiver circuit is configured to receive video data and a link clock signal and is configured to convert a plurality of valid link symbols in the video data into the active pixels responsive to the link clock signal and output the active pixels responsive to the reference clock signal.

3. The circuit arrangement of claim 2, wherein an active region of the video data includes packets that include the plurality of valid link symbols, each packet including a subset of the plurality of valid link symbols, and the first receiver circuit is configured to assert the video-clock-enable signal during the blanking period based on a count of the valid link symbols per packet.

4. The circuit arrangement of claim 3, wherein each packet further includes fill symbols.

5. The circuit arrangement of claim 3, wherein the first receiver circuit is configured to:
   assert a video-enable signal during the active period;
   assert a video-enable-for-clock-recovery signal during the blanking period; and
   assert the video-clock-enable signal in response to either the video-enable signal or the video-enable-for-clock-recovery signal being asserted.

6. The circuit arrangement of claim 3, wherein the valid link symbols include dummy link symbols in a blanking region, and the first receiver circuit is configured to:
   convert the dummy link symbols in the video data to dummy pixels responsive to the link clock signal; and
   output the dummy pixels responsive to the reference clock signal.

7. The circuit arrangement of claim 6, wherein the first receiver circuit includes a counter configured to increment with each cycle of the link clock signal, and the first receiver circuit is configured to enable converting the dummy link symbols to the dummy pixels in response to an output value from the counter being less than the count of the valid link symbols per packet during the blanking period.

8. The circuit arrangement of claim 6, wherein the first receiver circuit includes a first-in-first-out (FIFO) circuit having a write-clock port coupled to receive the link clock signal and a read-clock port coupled to receive the reference clock signal, and the receiver circuit is configured to:
   write the dummy pixels in the FIFO circuit and read the dummy pixels from the FIFO circuit; and
   assert the video-clock-enable signal during reading of the dummy pixels from the FIFO circuit.

9. The circuit arrangement of claim 2, wherein:
the plurality of valid link symbols in the video data include dummy link symbols in a blanking region; and
the receiver circuit is configured to:
  convert the dummy link symbols in the video data to dummy pixels responsive to the link clock signal,
  output the dummy pixels responsive to the reference clock signal,
  assert a video-enable signal during the active period,
  assert a video-enable-for-clock-recovery signal during the blanking period,
  assert the video-clock-enable signal in response to either the video-enable signal or the video-enable-for-clock-recovery signal being asserted,
  count a total number of the active pixels and the dummy pixels output, and
  disable the video-enable-for-clock-recovery signal in response to the total number being greater than a horizontal line threshold.

10. A video receiver, comprising:
a link symbol extractor circuit configured to receive video data and a link clock signal, assert a link-data-enable signal during an active period in response to packets of valid link symbols in the video data, each packet including a subset of the valid link symbols, and assert, during a blanking period, a link-data-enable-blanking signal for a period derived from a count of the valid link symbols per packet during the active period;
a link-to-pixel mapper circuit clocked by the link clock signal to convert the valid link symbols to active pixels in response to the link-data-enable signal, and convert dummy link symbols in the video data to dummy pixels in response to the link-data-enable-blanking signal, the link-to-pixel mapper circuit clocked by a reference clock signal to provide the active pixels and the dummy pixels;
a timing generator circuit configured to assert a video-enable-active signal in response to availability of the active pixels and assert a video-enable-blanking signal in response to availability of the dummy pixels;
an OR logic circuit configured to assert a video-clock-enable signal in response to either the video-enable-active signal or the video-enable-blanking signal being asserted; and
a clock buffer circuit having a clock-in port coupled to input the reference clock signal and an enable port coupled to input the video-clock-enable signal and configured to generate a video pixel clock signal having pulses of the reference clock signal as enabled by the video-clock-enable signal.

11. The video receiver of claim 10, wherein:
an active region of the video data includes the packets of the valid link symbols;
the link symbol extractor circuit includes a modulus-m counter circuit and m is a size of the packets; and
the link symbol extractor circuit is configured to assert the link-data-enable-blanking signal during the blanking period in response to an output value of the modulus-m counter being less than or equal to the count of the valid link symbols per packet.

12. The video receiver of claim 11, wherein the modulus-m counter circuit increments in response to the link clock signal.

13. The video receiver of claim 12, wherein the link symbol extractor circuit includes a blanking start detector circuit configured to detect blanking start symbols and blanking end symbols in the video data, de-assert the link-data-enable-blanking signal in response to detecting a blanking end link symbol, and assert the link-data-enable-blanking signal in response to detecting a blanking start symbol and the output value of the modulus-m counter circuit being less than or equal to the count of the valid link symbols per packet.

14. The video receiver of claim 10, wherein the link-to-pixel mapper circuit includes a first-in-first-out (FIFO) circuit configured to buffer the dummy pixels.

15. The video receiver of claim 14, wherein the FIFO circuit includes a write-enable input coupled to the link clock signal and a read-enable input coupled to the reference clock signal.

16. The video receiver of claim 15, wherein the FIFO buffer circuit is configured to signal the availability of the dummy pixels by de-asserting a FIFO-empty signal to the timing generator circuit.

17. The video receiver of claim 16, wherein the timing generator circuit is configured to assert a FIFO-read signal to a read-control input of the FIFO buffer circuit in response to the FIFO-empty signal being de-asserted during the blanking period.

18. The video receiver of claim 17, wherein:
the link symbol extractor circuit is configured to receive the video data organized as horizontal lines that include the valid link symbols and the dummy link symbols;
the timing generator circuit includes a counter circuit that counts a number of the active pixels and the dummy pixels converted by the link-to-pixel mapper circuit in each line of the horizontal lines; and
the timing generator circuit is configured to de-assert the video-enable-blanking signal in response to an output value from the counter circuit being greater than a horizontal threshold.

* * * * *